United States Patent [19]
Smith

[11] Patent Number: 5,215,051
[45] Date of Patent: Jun. 1, 1993

[54] MODIFIED ASPIRATED INTERNAL COMBUSTION ENGINE

[75] Inventor: Jack E. Smith, Warren, Mich.

[73] Assignees: Nicholas J. Lopiccolo, Rochester; Peter D. Keefe, Clinton Township, Macomb County, both of Mich.

[21] Appl. No.: 962,894

[22] Filed: Oct. 19, 1992

[51] Int. Cl.⁵ .................. F02B 75/06; F02B 75/04
[52] U.S. Cl. .................. 123/197.4; 123/78 F; 74/596; 74/44
[58] Field of Search ........... 123/197.4, 197.3, 48 B, 123/78 F; 74/595, 596, 44

[56] References Cited

U.S. PATENT DOCUMENTS

| | | | |
|---|---|---|---|
| 4,889,090 | 12/1989 | Werner et al. | 123/197.4 |
| 5,076,220 | 12/1991 | Evans et al. | 123/197.4 |
| 5,146,884 | 9/1992 | Merkel | 123/48 B |

*Primary Examiner*—E. Rollins Cross
*Assistant Examiner*—M. Macy
*Attorney, Agent, or Firm*—Peter D. Keefe

[57] ABSTRACT

A crankshaft eccentrically mounted to the engine block bearings of an internal combustion engine for providing improved volumetric efficiency. A modified crankshaft journal and engine block bearing structure is provided at each crankshaft support location so that the connecting rod bearings rotate about an eccentric centerline ($EC_L$). Eccentricity is achieved by off-setting the crankshaft journals a predetermined distance above the original true centerline ($TC_L$) of the crankshaft, preferably on the order of about one-quarter to one-half inch. The top dead center (TDC) of each piston remains the same relative to its cylinder, but the bottom dead center (BDC) of each piston relative to its cylinder is lowered by the amount of the off-set because the engine block bearings are lowered with respect to the true centerline of the crankshaft by the amount of the off-set on the crankshaft journals. The crankshaft is forged with the eccentric off-set, then is machined to provide the precise tolerance needed for fitting into the engine block bearings and is harmonically balanced as needed. The engine block bearings are enlarged over the original specification, and are lowered the same predetermined eccentric off-set distance. The crankshaft is then installed in the engine block.

6 Claims, 2 Drawing Sheets

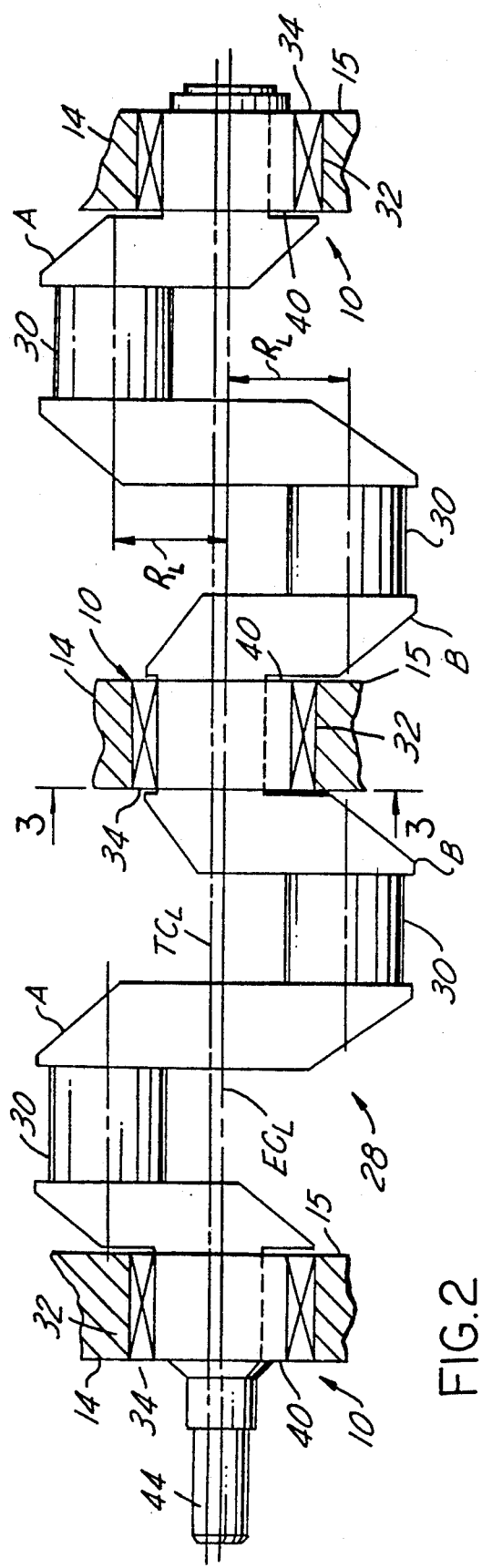
FIG.2
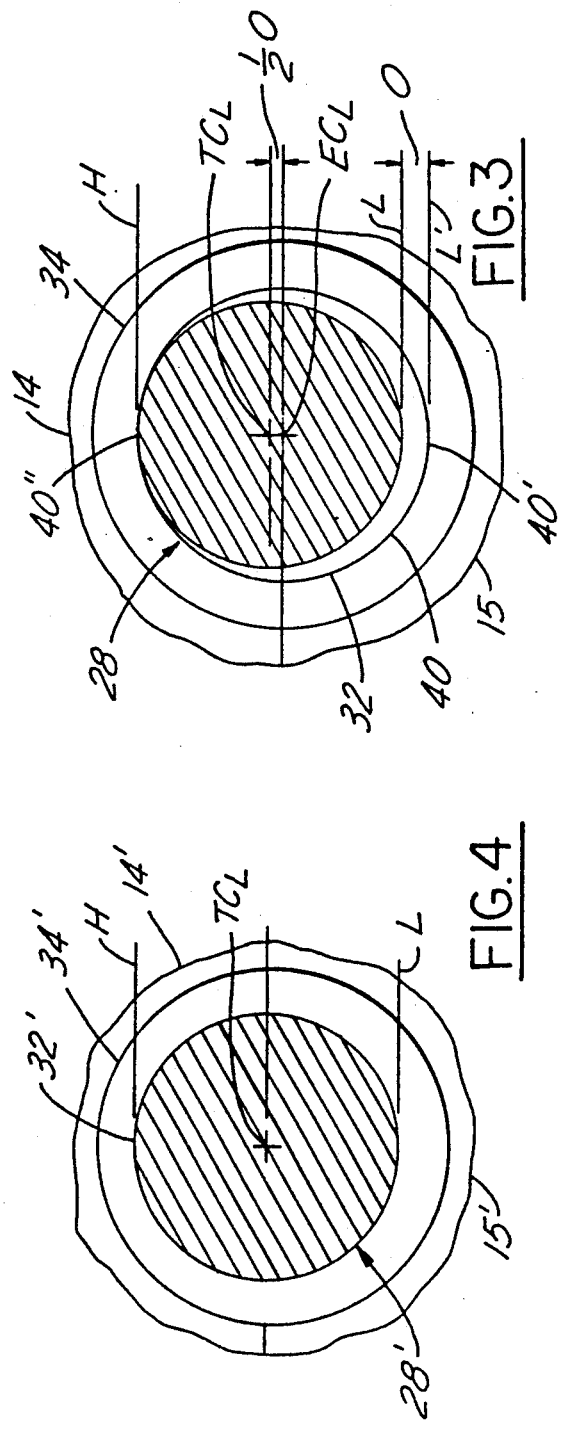
FIG.3
FIG.4

MODIFIED ASPIRATED INTERNAL COMBUSTION ENGINE

BACKGROUND OF THE INVENTION

1. Field of the Invention

The present invention relates to reciprocating internal combustion engines, and more particularly to the crankshaft and engine block bearings thereof. Still more particularly, the present invention relates to a modified crankshaft having eccentric crankshaft journals mounted with respect to modified engine block bearings.

2. Description of the Prior Art

Conventional reciprocating internal combustion engines utilize an engine block, cylinders in the engine block, pistons reciprocable within the cylinders, a crankshaft rotatably mounted at its journals to the engine block via engine block bearings, and connecting rods connecting each of the pistons to the crankshaft. Once these components are designed for a particular engine, the specifications are set and are not variable.

Because the pistons travel reciprocably within the cylinders based upon a circular movement of the connecting rod bearings about the centerline of the crankshaft, there are inevitable volumetric losses in the combustion chamber (that part of the cylinder above the piston). One source of volumetric losses arises because of combustion by-product gases in the combustion chamber after the exhaust stroke. As a result, the intake stroke mixes fuel and air with these by-product gases, thereby contributing to an inefficient power stroke. This loss is inevitable because of atmospheric equalization of pressure occurring during the exhaust stroke, preventing complete purging of the combustion chamber. Another source of volumetric losses arises because during the power stroke, heat and pressure are compounded by the rate of displacement of the piston, thereby resulting potentially in detonation, loss of engine power, fuel inefficiency and dirty emissions.

In the internal combustion art, it is known to relieve the aspiration related problems by installing accessory devices, such as blowers and turbines, which overcome atmospheric pressure. However, these devices are expensive, require maintenance and are most suitable to a narrow range of operating speeds.

Accordingly, what remains needed in the art is an increase in volumetric efficiency by introducing a variable in the displacement which affords increased aspiration during the intake stroke and affords a slower rate of combustion gas pressure build-up during the power stroke.

SUMMARY OF THE INVENTION

The present invention is a reciprocating internal combustion engine having a high volumetric efficiency because of an increment in the displacement due to increased piston travel which affords improved aspiration during the intake and exhaust strokes, a higher compression ratio during the compression stroke, and a slower rate of combustion gas pressure build-up during the power stroke.

The essential concept of the present invention is to eccentrically mount the crankshaft with respect to the engine block bearings by providing a modified crankshaft journal and engine block bearing structure at each crankshaft support location so as to cause the connecting rod bearings to rotate about an eccentric centerline ($EC_L$). Eccentricity is achieved by off-setting the crankshaft journals a predetermined distance from the original true centerline ($TC_L$) of the crankshaft. The top dead center (TDC) of each piston remains the same relative to its cylinder, but the bottom dead center (BDC) of each piston relative to its cylinder is lowered by the amount of the off-set because the engine block bearings are lowered with respect to the one or more cylinders by the amount of the off-set on the crankshaft journals. In this regard, the crank arms are configured so that each has an equal radial displacement from the eccentric centerline.

As a result of this eccentricity of the crankshaft journals, the maximum combustion chamber volume is incremented and the piston speed is increased per revolution per unit of time. These modifications to the original specifications of the engine effect to increase the volumetric efficiency of the engine from its original design. This occurs because of two aspects. The first aspect involves additional air being allowed into the combustion chamber during the intake stroke. The added air minimizes the effect of by-product air being present during the power stroke, thereby improving combustion and reducing harmful emissions. The second aspect involves increased speed and displacement of the piston due to the eccentric movement of the connecting rods at the crankshaft. This results in a slower rate of combustion gas pressure build-up without detonation, an increased fuel-air mix volume, and an increased compression ratio. These two aspects combine so as to provide higher volumetric efficiency for the engine, even approaching 100 percent. Thus, by providing modified crankshaft and modified engine block bearing structures, the benefits derived include: added power, improved air to fuel ratio, increased compression ratio, higher engine torque, increased miles per gallon, and cleaner emissions over the original engine specifications.

To establish the modified crankshaft journals having the eccentric off-set, the modified crankshaft is forged with the predetermined eccentric off-set with the crank arms centered about the eccentric centerline. The modified crankshaft is then machined to provide the precise tolerance needed for fitting into the engine block bearings and is harmonically balanced as needed. The engine block bearings are enlarged over the original specification, and are lowered the same predetermined eccentric off-set distance. The modified crankshaft is then installed in the engine block.

Accordingly, it is an object of the present invention to provide a reciprocating internal combustion engine having a modified aspiration function which increases the volumetric efficiency of the engine.

It is another object of the present invention to provide a reciprocating internal combustion engine having a modified crankshaft including modified crankshaft journals provided with an eccentric off-set, the modified crankshaft journals being mounted with respect to engine block by modified engine block bearings which are lowered in a direction away from the one or more cylinders by the same off-set, the combination of the modified crankshaft and modified engine block bearings providing increased volumetric efficiency of the engine over the original engine specifications.

It is a further object of the present invention to provide a reciprocating internal combustion engine having a modified aspiration function which provides for a better air to fuel ratio.

It is yet a further object of the present invention to provide a reciprocating internal combustion engine having a modified aspiration function which provides for an improved combustion process.

It is still another further object of the present invention to provide a reciprocating internal combustion engine having a modified aspiration function which provides for improved efficiency and reduced emissions.

These, and additional objects, advantages, features and benefits of the present invention will become apparent from the following specification.

BRIEF DESCRIPTION OF THE DRAWINGS

FIG. 2 is a side view of a modified crankshaft according to the present invention depicted with partly broken away adjacent modified engine block bearing structure.

FIG. 3 is a partly sectional end view of the modified crankshaft and modified engine block bearing structures, seen along lines 3—3 in FIG. 2.

FIG. 4 is a partly sectional end view of a crankshaft and engine block bearing structures of a conventional internal combustion engine before being modified according to the present invention as depicted in FIGS. 1, 2 and 3.

DETAILED DESCRIPTION OF THE PREFERRED EMBODIMENT

Figure 1:
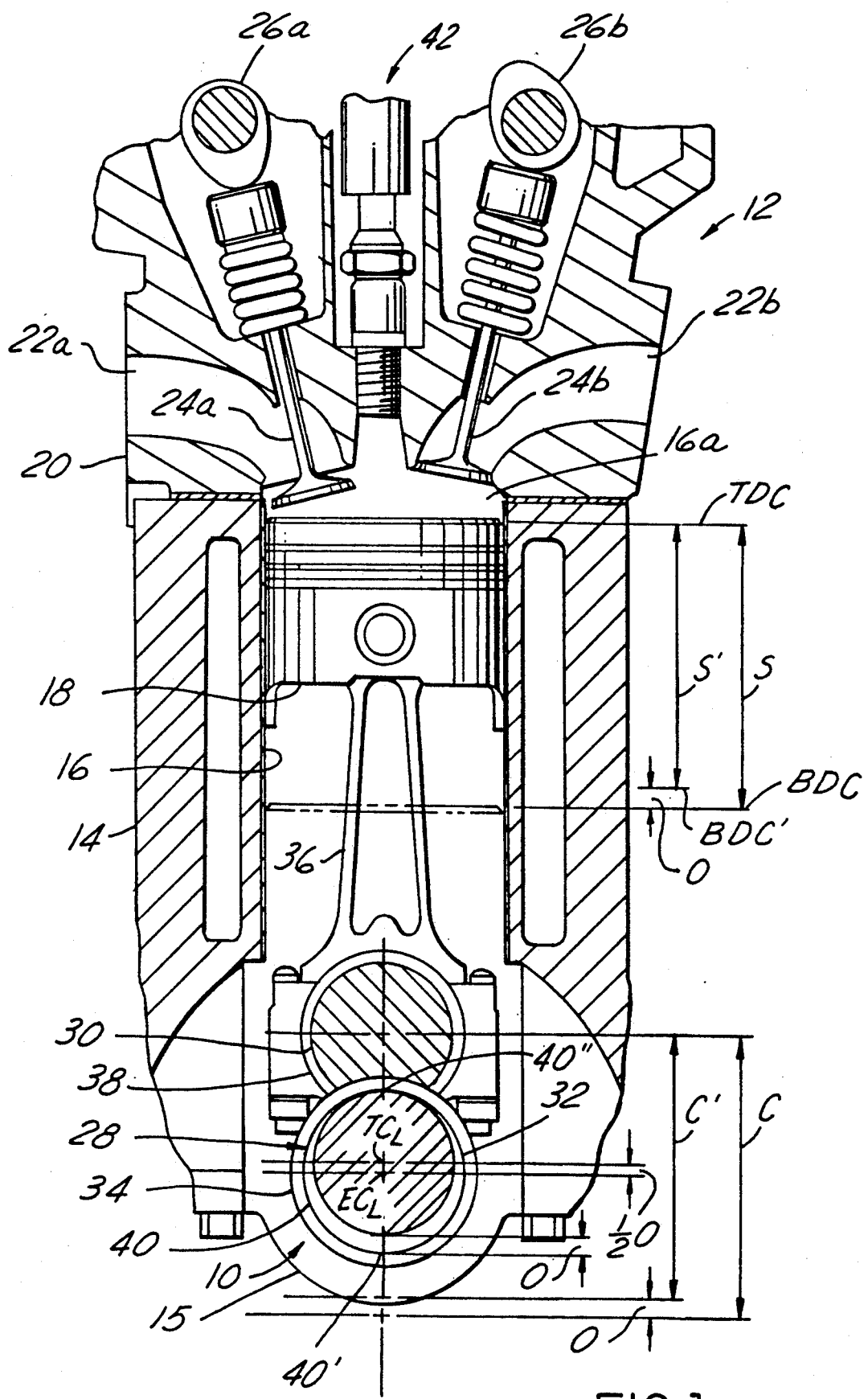
FIG. 1 is a partly sectional end view of a reciprocating internal combustion engine provided with the modified crankshaft and engine block bearing structure according to the present invention.

Referring now to the Drawing, FIG. 1 depicts the modified crankshaft and engine block bearing structures 10 according to the present invention in relation to an internal combustion engine 12. The internal combustion engine 12 by way of example is of the reciprocating, four cycle type, having an engine block 14 containing one or more cylinders 16, a piston 18 reciprocably movable in each cylinder, respectively, a head 20 connected with the engine block and covering the top end of each cylinder so as to form a combustion chamber 16a above each piston, intake and exhaust manifolds 22a, 22b for each cylinder, intake and exhaust valves 24a, 24b for each cylinder which are timed by one or more cams 26a, 26b, the cams being rotatably timed by mechanical linkage with respect to a modified crankshaft 28. The modified crankshaft 28 has one U-shaped crank arm 30, respectively, for each piston 18, and further has at least two modified crankshaft journals 32, each of which seating into a respective modified engine block bearing 34. Each piston 18 is connected with the modified crankshaft 28 via a respective connecting rod 36. In this regard, each connecting rod 36 is pivotally connected at one end with its respective piston 18 and rotatably connected, via a connecting rod bearing 38, with its respective crank arm 30. An ignition device 42 is ordinarily located at the head 20 for providing initiation and timing of combustion in each combustion chamber 16a, which may or may not be in the form of an electronic ignition.

In the foregoing description, the internal combustion engine 12 operates in a conventional four cycle manner (each piston having an intake stroke, a compression stroke, a power stroke and an exhaust stroke during the whole of which the crankshaft makes two complete revolutions), except as pertains to the effects of the modified crankshaft and engine block bearing structures 10, as will be detailed hereinbelow.

As can be discerned from FIG. 1, the piston 18 reciprocates from a highest location in the cylinder 16, known as top dead center to a lowest location in the cylinder, known as bottom dead center. The internal combustion engine 12 depicted in FIG. 1 was originally designed to have the piston 18 reciprocate between an original top dead center TDC and an original bottom dead center BDC'. However, the modified crankshaft and engine block bearing structures 10 now result in the piston 18 reciprocating between the aforesaid top dead center TDC and a modified bottom dead center BDC. While the location of the top dead center TDC remains unchanged, the travel difference between the original bottom dead center BDC' and the modified bottom dead center BDC is an amount of increased travel of the piston 18 in the cylinder 16 which translates into an increased maximum volume of the combustion chamber 16a. The amount of increase of travel of the piston 18 is equal to the off-set O provided by the modified crankshaft and engine block bearing structures 10. This increased displacement is due to each crank arm 30 now rotating about a new center of rotation, an eccentric centerline $EC_L$, that is displaced a distance of one-half the off-set O in relation to the original center of rotation, the true centerline $TC_L$. More specifically, since each crank arm 30 rotates about the eccentric centerline $EC_L$ rather than the true centerline $TC_L$, the diameter of travel of the crank arm over each rotation is now a length C which is larger than the original length C' by a distance equal to the off-set O. The off-set O is preferred to have a length of about one half inch, but can be otherwise within the limits of the original structure of the internal combustion engine 12. That is, the off-set O may be set to a certain maximum length which does not result in interference between relatively moving parts and which does not result in impaired engine operation, such as if the piston travel reaches an untowardly too low location in its cylinder.

While movement of one piston has been detailed in the foregoing description, the aforesaid piston travel between the top dead center TDC and the modified bottom dead center (BDC') applies similarly to all pistons of the internal combustion engine 12.

The change of piston travel between the original bottom dead center BDC and the modified bottom dead center BDC' is the result of the modified crankshaft and engine block bearing structures 10, the nature of which will now be detailed.

Firstly, the modifications necessary to provide the modified crankshaft 28 will be detailed with the aid of FIGS. 1 and 2.

The modified crankshaft 28 is provided by being forged, machined and balanced as needed. In so doing, at least two modified crankshaft journals 32 are provided, and at least one crank arm 30 is provided.

In the case of a multi-cylinder internal combustion engine 12, a crank arm 30 is provided for each piston 18 of each cylinder 16. In this regard, each crank arm 30 is located in axial alignment with its respective cylinder. The crank arms 30 have predetermined radial displacement from the eccentric centerline $EC_L$, ordinarily being all equal to a radial length $R_L$ (wherein $2R_L$ equals C in FIG. 1). For example, FIG. 2 shows a modified crankshaft 28 for a four cylinder combustion engine 12 in which a first set A of crank arms is located on a first side of the modified crankshaft, while a second set B of crank arms is located on a second, opposite side of the modified crankshaft. Each crank arm 30 extends the radial length $R_L$ from the eccentric centerline $EC_L$. Accordingly, one aspect of the aforesaid modifications is to change the radial length of the crank arms from being centered on the original, true centerline $TC_L$ to being centered on the new, eccentric centerline $EC_L$.

Each modified crankshaft journal 32 includes an off-set portion 40. The off-set portion 40 has a maximum 40' that is equal to the off-set O. The maximum 40' of the off-set portion 40 is shown located on the second side of the modified crankshaft, that is, on the side thereof facing toward the second set B of crank arms, but this location is not a requirement. The off-set portion 40 smoothly decreases on either side of the maximum 40' to a minimum 40'' that is equal to a zero off-set at the opposite side of the modified crankshaft on the first side thereof, that is, on the side thereof facing toward the first set A of crank arms. The off-set portion 40 is provided at the time the crankshaft 28 is forged, and is subsequently machined into preset tolerance.

The original crankshaft 28' (shown in FIG. 4) rotated about the true centerline $TC_L$, however, the modified crankshaft 28 now rotates about the eccentric centerline $EC_L$. The original crank arms of the original crankshaft 28' all had a predetermined radial length. Since an off-set portion 40 has been provided on the modified crankshaft 28, the radial length of the crank arms thereof must be elongated from that of the original crank arm corresponding thereto by the amount of the off-set at the corresponding side of the modified crankshaft. In the example depicted in FIG. 2, the radial length for the first set A of crank arms 30 did not need elongation over that of the corresponding original crank arms of the original crankshaft 28' because they are located on the side of the modified crankshaft having the minimum 40'', whereas the radial length of the second set B of crank arms must be elongated over that of the corresponding original crank arms of the original crankshaft 28' by an amount of the off-set O, since they are located on the side of the modified crankshaft having the maximum 40'. A crank arm located at an arbitrary location on the modified crankshaft would be provided with a radial length $R_L$ which is elongated with respect to the radial length of the corresponding original crank arm of the original crankshaft 28' by an amount equal to the off-set at that particular location.

Whenever a crank arm 30 is located on the side of the modified crankshaft having the minimum 40'', no elongation of the radial length $R_L$ over that of the corresponding original crank arm of the original crankshaft 28' is required. Accordingly, minimum modification is involved for single cylinder internal combustion engines where the off-set portion 40 is provided so that the minimum 40'' thereof is on the same side of the modified crankshaft as the crank arm 30.

The modified engine block bearing 34 (shown in FIG. 3) is provided by enlargement of the original engine block bearing 34' (shown in FIG. 4) in order to accommodate the increased diameter of the modified crankshaft journal 32 (the diameter of the original crankshaft journal 32' of the original crankshaft 28' being depicted in FIG. 4). The difference in diameters between the original crankshaft journal 32' and the modified crankshaft journal 32 is the off-set O. Now, since the off-set portion 40 on the modified crankshaft journal 32 tends to raise the maximum height of travel of the piston 18 in the cylinder 16 above top dead center TDC by the amount of the off-set O, the modification of the original engine block bearing 34' is executed so as to provide a new, eccentric centerline $EC_L$ that is located displaced from the original, true centerline $TC_L$ of the original engine block bearing 34' (as shown in FIG. 3) by a distance of one-half the off-set O. The process is carried-out by removing the original engine block bearing caps 15' and the original engine block bearings 34', machining the engine block 14 so as to accommodate the modified engine block bearings 34, installing the modified engine block bearings 34 and installing the modified engine block bearing caps 15.

The aforesaid modification specifications can be best understood by comparative examination between FIGS. 3 and 4. The maximum high point H of the original crankshaft journal 32' and the modified crankshaft journal 32 is the same relative to the engine block. However, the original crankshaft journal 32' has a low point of L relative to the engine block, while the modified crankshaft journal has a low point of L' relative to the engine block. Since the high point H remains the same, the top dead center TDC of the piston 18 remains the same, whereas since the low points L and L' are different by the amount of the off-set O, the bottom dead centers BDC, BDC' are also different by the amount of the off-set O. In this regard, the modified bearing low point off-set from L to L', and the centerline off-set from $TC_L$ to $EC_L$ are both in line with the cylindrical axis of each of the one or more cylinders 16 of the internal combustion engine 12.

As can be discerned from FIG. 2, the output shaft portion 44 of the crankshaft 28 is located in line with the eccentric centerline $EC_L$.

The modified crankshaft journal and engine block bearing 10 may be applied to modify an already existing engine, or to modify manufacturing specifications at a manufacturing plant with respect to engines formerly being produced under an original set of specifications. Since the off-set O is preferably kept small enough so as to avoid interference among relatively moving parts and without impairment of engine operation, many originally specified internal combustion engines can be modified according to the present invention, as the new piston travel will be accommodated by the engine block, the cylinders and other components thereof without (in most cases) further modification.

In operation, since the connecting rods rotate about the eccentric centerline $EC_L$, increased piston travel is achieved which provides increased piston velocity per revolution per unit of time which translates into a whole host of benefits over a conventional internal combustion engine having an original set of specifications. Due to the increased speed of the piston, more complete purging of combustion by-product gases during the exhaust stroke is achieved. This occurs because as the combustion chamber volume decreases the piston speed increases so as to expel more combustion by-product gases than would otherwise be possible. Due to the increased piston displacement, an increased volume of air or air/fuel mixture is drawn into the combustion chamber during the intake stroke which provides for a greater chemical potential energy content in the combustion chamber. During the compression stroke, the added piston displacement results in the air or air/fuel mixture present in the combustion chamber from the intake stroke to be compressed to a higher compression ration. During the power stroke, the increased maximum volume of the combustion chamber provides a more favorable combustion chamber expansion relationship with respect to the expanding gas during combustion, thus promoting combustion gases to burn progressively rather than compounding. This translates into a more complete combustion in which detonation is assuaged because combustion is more evenly distributed within the combustion chamber during the power stroke.

In order to maximize the foregoing benefits of the modified crankshaft journal and engine block bearing structure 10, various other components of the internal combustion engine 12 may be adjusted, such as the timing and shape of the cams 26a, 26b.

To those skilled in the art to which this invention appertains, the above described preferred embodiment may be subject to change or modification. For instance, while an in-line, four cycle, four cylinder internal combustion engine has been shown in FIG. 2, the present invention can be readily applied to single cylinder internal combustion engines and to multi-cylinder internal combustion engines of any configuration, such as for example "V-8" or radial configurations, to internal combustion engines operating on the Otto or Diesel principle, and to four or two cycle internal combustion engines. Such change or modification can be carried out without departing from the scope of the invention, which is intended to be limited only by the scope of the appended claims.

What is claimed is:

1. An internal combustion engine, comprising:
   an engine block;
   at least one cylinder located in said engine block, said at least one cylinder having a top end;
   at least one piston, each piston of said at least one piston being reciprocably movable in a respective cylinder of said at least one cylinder between a top dead center and a bottom dead center;
   a head connected with said engine block for covering said top end of said at least one cylinder so as to form a combustion chamber above said at least one piston;
   aspiration means for providing gas entry into said combustion chamber of said at least one cylinder and for providing gas exit from said combustion chamber of said at least one cylinder;
   valve means for timing communication of said combustion chamber of said at least one cylinder with respect to said aspiration means;
   ignition means for providing initiation and timing of combustion in said combustion chamber of said at least one cylinder;
   a crankshaft rotatably mounted to said engine block, said crankshaft having at least one crank arm;
   connecting rod means between said at least one piston and said at least one crank arm for translating reciprocation of said at least one piston into rotation of said crankshaft;
   mounting means for rotatably mounting said crankshaft to said engine block, said mounting means being located at least two mutually spaced mounting locations with respect to said engine block, said mounting means at each said mounting location comprising:
      a crankshaft journal located on said crankshaft, said crankshaft journal having a crankshaft journal cross-section, said crankshaft journal cross-section including a crankshaft cross-section and an off-set portion, said off-set portion having a maximum which is equal to a predetermined off-set, said predetermined off-set being greater than a zero off-set, said maximum being located on a predetermined side of said crankshaft, said off-set portion smoothly decreasing from said maximum to a minimum from each side of said maximum, said minimum being equal to a zero off-set, said minimum being located on said crankshaft opposite said maximum; and
      an engine block bearing connected with said engine block, said engine block bearing rotatably supporting said crankshaft journal;
   wherein said crankshaft rotates in relation to said engine block about an eccentric centerline passing axially through said crankshaft journal cross-section, said eccentric centerline being displaced from a true centerline passing axially through said crankshaft cross-section by a distance equal to one-half said off-set, wherein said at least one crank arm has a predetermined radial length centered on said eccentric centerline, and wherein said modified crankshaft has at least one output shaft portion axially aligned with said eccentric centerline.

2. The internal combustion engine of claim 1, wherein said at least one cylinder comprises at least two cylinders, said at least one piston comprises at least two pistons and said at least one crank arm comprises at least two crank arms, each crank arm of said at least two crank arms having said predetermined radial length centered on said eccentric centerline.

3. A crankshaft and engine block bearing structure for a reciprocating internal combustion engine, comprising:
   an engine block;
   a crankshaft rotatably mounted to said engine block, said crankshaft having at least one crank arm, said at least one crank arm being located on a first side of said crankshaft;
   at least two crankshaft journals located on said crankshaft, each crankshaft journal of said at least two crankshaft journals having a crankshaft journal cross-section, said crankshaft journal cross-section including a crankshaft cross-section and an off-set portion, said off-set portion having a maximum which is equal to a predetermined off-set, said predetermined off-set being greater than a zero off-set, said maximum being located on a predetermined side of said crankshaft, said off-set portion smoothly decreasing from said maximum to a minimum from each side of said maximum, said minimum being equal to a zero off-set, said minimum being located on a side of said crankshaft opposite said maximum; and
   at least two engine block bearings connected with said engine block, each said engine block bearing rotatably supporting a respective said crankshaft journal;
   wherein said crankshaft rotates in relation to said engine block about an eccentric centerline passing axially through said crankshaft journal cross-section, said eccentric centerline being displaced from a true centerline passing axially through said crankshaft cross-section by a distance equal to one-half said off-set, wherein said at least one crank arm has a predetermined radial length centered on said eccentric centerline, and wherein said modified crankshaft has at least one output shaft portion axially aligned with said eccentric centerline.

4. The crankshaft and engine block bearing structure of claim 3, wherein said at least one crank arm comprises at least two crank arms, each crank arm of said at least two crank arms having said predetermined radial length centered on said eccentric centerline.

5. A method for modifying an internal combustion engine, the internal combustion engine including an engine block, at least one cylinder located in the engine block, at least one piston, each piston of said at least one piston being reciprocably movable in a respective cylinder of said at least one cylinder between a top dead center and an original bottom dead center, an original crankshaft rotatably mounted to the engine block, the original crankshaft having at least one crank arm, connecting rod means between the at least one piston and the at least one crank arm for translating reciprocation of the at least one piston into rotation of the original crankshaft, and mounting means for rotatably mounting the original crankshaft to the engine block, the mounting means being located at at least two mutually spaced mounting locations with respect to the engine block, the mounting means at each mounting location including an original crankshaft journal located on the original crankshaft, the original crankshaft journal having an original crankshaft journal cross-section, and an original engine block bearing connected with the engine block, the original engine block bearing rotatably supporting the original crankshaft journal, wherein the original crankshaft rotates in relation to the engine block about a true centerline passing axially through the original crankshaft journal cross-section, the original crankshaft having at least one original output shaft portion axially aligned with respect to the true centerline, said method comprising the steps of:

removing the original crankshaft from the engine block;

providing a modified crankshaft having at least two modified crankshaft journals connected thereto, said modified crankshaft further having at least one output shaft portion connected thereto, each said modified crankshaft journal having a modified crankshaft journal cross-section, said modified crankshaft journal cross-section including the original crankshaft cross-section and an off-set portion, said off-set portion having a maximum equal to a predetermined off-set, said predetermined off-set being greater than a zero off-set, said maximum being located on a predetermined side of said modified crankshaft, said off-set portion smoothly decreasing from said maximum to a minimum from each side of said maximum, said minimum being equal to a zero off-set, said minimum being located on said modified crankshaft opposite said maximum;

removing the original engine block bearing from the engine block at each of the at least two mounting locations;

providing at least two modified engine block bearings, each modified engine block bearing of said at least two modified engine block bearings being structured for rotatably supporting a respective said modified crankshaft journal;

machining the engine block at each of the at least two mounting locations so as to accommodate installation with respect thereto of said at least two engine block bearings; and installing said at least two modified engine block bearings and said modified crankshaft in said engine block so that said modified crankshaft is supported rotatably with respect to said engine block by said at least two modified engine block bearings; wherein said modified crankshaft rotates in relation to said engine block about said eccentric centerline, said eccentric centerline passing axially through said modified crankshaft journal cross-section, said eccentric centerline being displaced from said true centerline a distance one-half said off-set in a direction away from said at least one cylinder; wherein said at least one output shaft portion is axially aligned with respect to said eccentric centerline; and wherein said at least one piston reciprocates between the top dead center and a new bottom dead center, said new bottom dead center being farther from the top dead center than was the original bottom dead center by a distance equal to said off-set.

6. A method for modifying production of internal combustion engines, each internal combustion engine produced having a predetermined set of specifications for its components, the components including an engine block, at least one cylinder located in the engine block, at least one piston, each piston of said at least one piston being reciprocably movable in a respective cylinder of said at least one cylinder between a top dead center and an original bottom dead center, an original crankshaft rotatably mounted to the engine block, the original crankshaft having at least one crank arm, connecting rod means between the at least one piston and the at least one crank arm for translating reciprocation of the at least one piston into rotation of the original crankshaft, and mounting means for rotatably mounting the original crankshaft to the engine block, the mounting means being located at at least two mutually spaced mounting locations with respect to the engine block, the mounting means at each mounting location including an original crankshaft journal located on the original crankshaft, the original crankshaft journal having an original crankshaft journal cross-section, and an original engine block bearing connected with the engine block, the original engine block rotatably supporting the original crankshaft journal, wherein the original crankshaft rotates in relation to the engine block about a true centerline passing axially through the original crankshaft journal cross-section, the original crankshaft having at least one original output shaft portion axially aligned with respect to the true centerline, said method comprising the steps of:

substituting for the original crankshaft a modified crankshaft having at least two modified crankshaft journals connected therewith and further at least one output shaft portion connected therewith, each said modified crankshaft journal having a modified crankshaft journal cross-section, said modified crankshaft journal cross-section including the original crankshaft cross-section and an off-set portion, said off-set portion having a maximum equal to a predetermined off-set, said predetermined off-set being greater than a zero off-set, said maximum being located on a predetermined side of said modified crankshaft, said off-set portion smoothly decreasing from said maximum to a minimum from each side of said maximum, said minimum being equal to a zero off-set, said minimum being located on said modified crankshaft opposite said maximum;

substituting for the at least two original engine block bearings at least two modified engine block bearings, each modified engine block bearing of said at least two modified engine block bearings being structured for rotatably supporting a respective said modified crankshaft journal;

providing the engine block with a modified specification at each of the at least two mounting locations so as to accommodate installation with respect thereto of said at least two engine block bearings; and installing said at least two modified engine block bearings and said modified crankshaft in the engine block so that said modified crankshaft is supported rotatably with respect to said engine block by said at least two modified engine block bearings;

wherein said modified crankshaft rotates in relation to said engine block about said eccentric centerline, said eccentric centerline passing axially through said modified crankshaft journal cross-section, said eccentric centerline being displaced from said true centerline a distance one-half said off-set in a direction away from said at least one cylinder; wherein said at least one output shaft portion is axially aligned with respect to said eccentric centerline; and wherein said at least one piston reciprocates between the top dead center and a new bottom dead center, said new bottom dead center being farther from the top dead center than was the original bottom dead center by a distance equal to said off-set.

* * * * *